Dec. 13, 1966   D. KELLERMAN   3,292,063
WOUND CAPACITORS
Filed Aug. 3, 1964   2 Sheets-Sheet 1
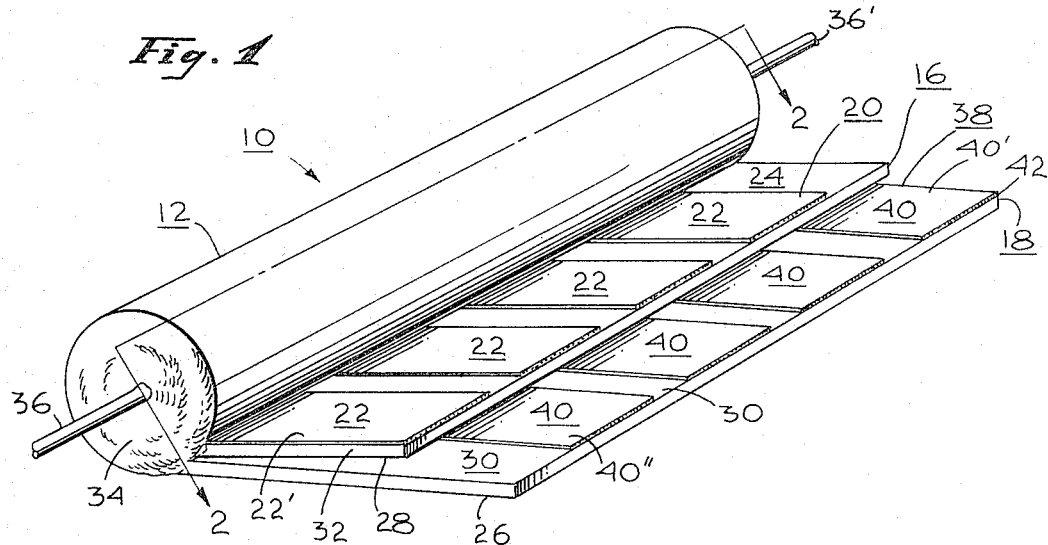
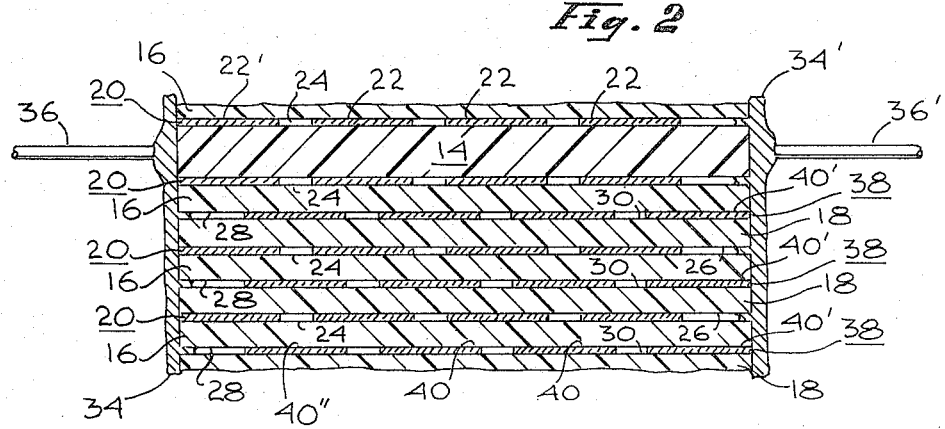
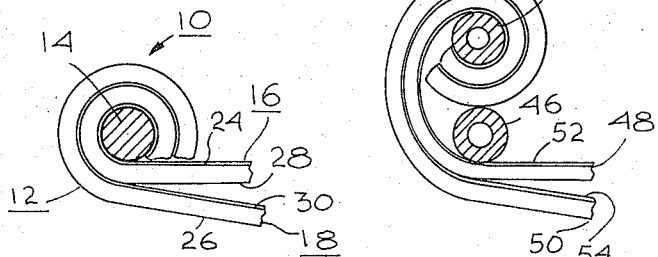
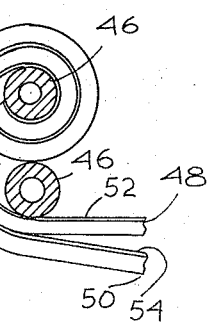
INVENTOR
DAVID KELLERMAN
BY
Don Finkelstein
ATTORNEY

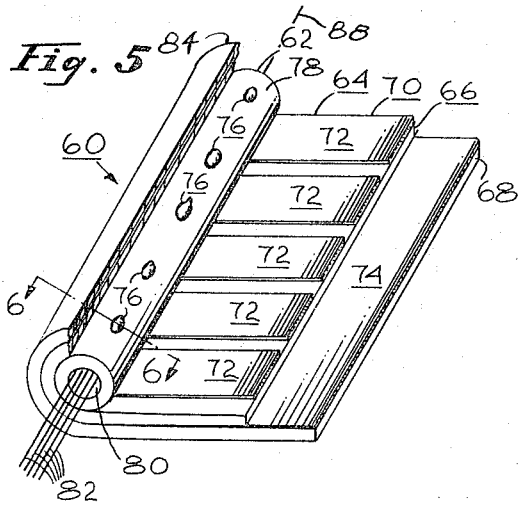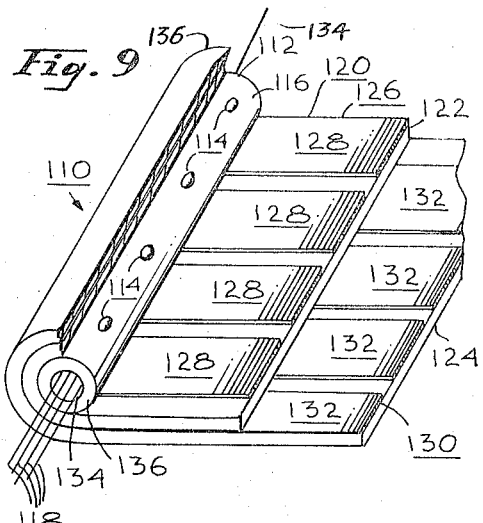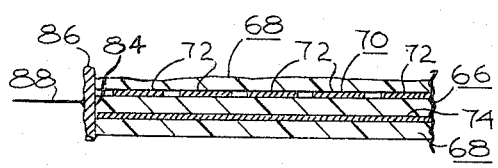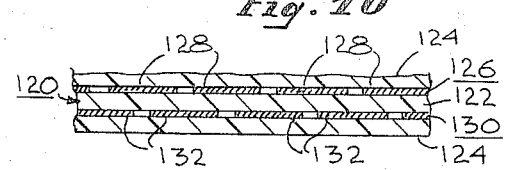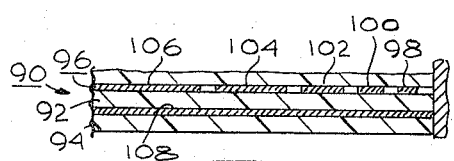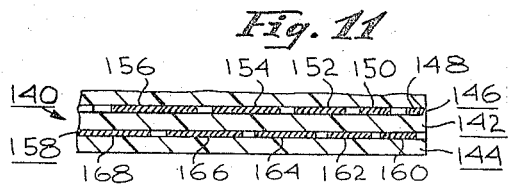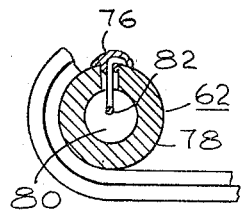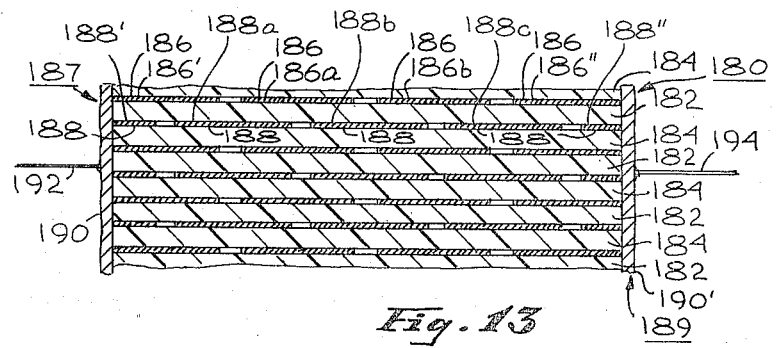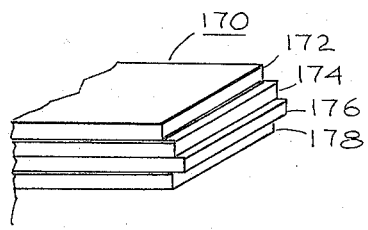
INVENTOR
DAVID KELLERMAN
BY Don Finkelstein
ATTORNEY United States Patent Office 3,292,063
Patented Dec. 13, 1966

3,292,063
WOUND CAPACITORS
David Kellerman, 1485 S. Cardiff, Los Angeles, Calif.
Filed Aug. 3, 1964, Ser. No. 387,105
16 Claims. (Cl. 317—260)

This invention relates to the capacitor art and more particularly to an improved wound capacitor.

In many high voltage applications there has long been a need for a compact wound capacitor capable of withstanding comparatively high voltages and also capable of operating as a delay line to provide a predetermined and known time delay for the transmission of electrical energy therethrough.

Wound capacitors having multiple electric layers alternatively wound with electrically conductive layers have generally provided a higher breakdown voltage than single dielectric layer wound capacitors. This results from the fact that in a single dielectric layer wound capacitor the actual breakdown voltage is less than the theoretical breakdown voltage for a given dielectric material and thickness because of "faults" or non-homogeneities in the dielectric layer. Thus, when multiple dielectric layers are utilized there is very low probability that such non-homogeneities will be aligned between the electrically conductive layers and therefore the theoretical breakdown voltage is closely approached.

In addition, in many applications such as computers there has long been a need for an extremely lightweight and compact wound capacitor capable of providing, if desired, a plurality of different capacities, for example, a decade sequence of capacitances, in a single capacitor unit.

Prior capacitors utilized to meet the above desiderata have not always been completely satisfactory. For example, many high voltage capacitors and delay lines have been comparatively large and heavy and generally had a corona discharge between the leads at or near the breakdown capacitance thereof. Further, to the best of applicant's knowledge, there has not been produced a compact wound capacitor capable of providing a plurality of predetermined capacitances in a single unit and such a capacitor capable of miniaturization and microminiaturization for ultra-lightweight applications such as computers, space vehicles and the like.

Accordingly, it is an object of applicant's invention herein to provide an improved capacitor.

It is another object of applicant's invention herein to provide an improved wound capacitor.

It is another object of applicant's invention herein to provide an improved wound high voltage capacitor.

It is yet another object of applicant's invention herein to provide a wound capacitor capable of providing a plurality of individual capacitances in a single capacitor unit.

The above and other objects are achieved, according to one embodiment of applicant's invention by providing a film member wound around a dielectric core member. The film member comprises alternate layers of dielectric material such as Teflon, polyethylene, or the like, and electrically conductive layers. The electrically conductive layers may, for example, be foil or, in the preferred embodiment of applicant's invention, may be metalized layers vacuum deposited directly upon each of the dielectric layers.

At least one of the electrically conductive layers comprises a plurality of strips spirally wound around the dielectric core and each of these strips is electrically insulated from each of the other strips. The other electrically conductive layers may also comprise a plurality of electrically conductive strips spirally wound around said dielectric core member. Thus, for example, when the electrically conductive layers comprise a plurality of electrically conductive strips each insulated from the other, such strips may be vacuum deposited upon a surface of the dielectric layer and then the two dielectric layers with the vacuum deposited metalized strips thereon may be spirally wound around the core member. One of the strips on the first electrically conductive layer is adjacent a first end of the capacitor and one of the strips on the second electrically conductive layer is adjacent the second end of the capacitor. The ends of the capacitors may then be soldered, metal dipped, or the like, to provide good electrical contact with the electrically conductive strip adjacent that end of the capacitor. Leads may then be soldered or otherwise coupled to the ends of the capacitor and thus the first electrically conductive layer comprises a first capacitor electrode and a second electrically conductive layer comprises a second capacitor electrode. This arrangement of applicant's invention, which is useful as a high voltage capacitor, provides a comparatively high voltage breakdown in a comparatively compact arrangement due to the total length of electrical path between each of the individual electrical strips comprising the first capacitor electrode and the second capacitor electrode.

In other embodiments of applicant's invention, electrical contact points are coupled to the dielectric core member and individual leads are selectively coupled to each of the contact points. The first electrically conductive layer comprising a plurality of electrically conductive strips each insulated from the other is wound around the core with one strip in contact with each of the contact points. The second electrically conductive layer, which may be a single electrically conductive strip substantially coextensive in axial length with the core member provides a common second capacitor electrode and each of the individual electrically conductive strips of the first electrically conductive layer comprises a first capacitor electrode. Thus, a plurality of capacitors are provided between a lead connected to the second electrically conductive layer and each of the leads connected to the contact points in the dielectric core member.

In other embodiments of applicant's invention the width of the electrically conductive strips comprising the first electrically conductive layer may be varied. That is, for example, the strips may be made sequentially greater in width in a prearranged pattern, for example, a unit increase in width of each strip to provide different capacitances between each of the leads connected to the electrical contact points in the dielectric layer and the second electrically conductive strip.

The above and other embodiments of applicant's invention are explained in greater detail in the following description taken together with the accompanying drawing wherein similar reference characters refer to similar elements throughout and in which:

FIGURE 1 is a perspective view of one embodiment of applicant's invention;

FIGURE 2 is a sectional view along the line 2—2 of FIGURE 1;

FIGURE 3 illustrates one method of winding applicant's improved wound capacitor;

FIGURE 4 illustrates another embodiment of applicant's invention;

FIGURE 5 is a perspective view of another embodiment of applicant's invention;

FIGURE 6 is a sectional view along the line 6—6 of FIGURE 5;

FIGURE 7 illustrates the film member utilized in winding the capacitor illustrated in FIGURE 5;

FIGURE 8 illustrates the film member useful in another embodiment of applicant's invention;

FIGURE 9 is a perspective view of another embodiment of applicant's invention;

FIGURE 10 illustrates the film member utilized in the capacitor illustrated in FIGURE 9;

FIGURE 11 illustrates the film member useful in another embodiment of applicant's invention; and FIGURES 12 and 13 illustrate other embodiments of applicant's invention.

Referring now to FIGURES 1 and 2, there is shown one embodiment of applicant's invention. As shown thereon there is a wound capacitor generally designated 10 comprising a film member generally designated 12 spirally wound around a dielectric core member 14. The dielectric core member 14 extends substantially throughout the axially length of the capacitor 10.

In this embodiment of applicant's invention the dielectric core member 14 may comprise, for example, a ceramic rod.

The film member 12 comprises a first dielectric layer 16 and a second dielectric layer 18. The first dielectric layer 16 and second dielectric layer 18 are substantially coextensive throughout the length of the capacitor 10 and are tightly wound around the dielectric core member 14.

Applicant has found that Teflon, Mylar, polyethylene, or other similar dielectric materials are satisfactory for utilization in applicant's improved capacitor arrangement described herein.

A first electrically conductive layer generally designated 20 is comprised of a plurality of spaced-apart electrically conductive strips 22. As seen on FIGURE 2 the strips 22 are intermediate an upper surface 24 of the first dielectric layer 16 and the lower surface 26 of the second dielectric layer 18. In the arrangement shown on FIGURES 1 and 2 it can be seen that the capacitor 10 is wound with the electrically conductive strips 22 adjacent the dielectric core member 14 during the first turn thereof. In this embodiment of applicant's invention the lower surface 28 of the first dielectric layer 16 or the lower surface 26 of the second dielectric layer 18 could equally well have been positioned adjacent the dielectric core 14 during the first turn thereof.

The first electrically conductive layer 20 has a first strip 22′ that is adjacent a first edge 32 of the first dielectric layer 16. When the capacitor 10 is completely wound a preselected number of turns the edge 32 of the first dielectric layer 16 is substantially coated with an electrically conductive coating 34 which, for example, may be a solder dip or a metal spray and the coating 34 provides electrical continuity and contact throughout substantially the entire length of the electrically conductive strip 22′. An electrical lead 36 may be soldered to the electrically conductive coating 34 and thus the first electrically condutive layer 20 defines a first capacitor electrode for the capacitor 10.

A second electrically conductive layer 38 is intermediate the lower surface 28 of the first dielectric layer 16 and the upper surface 30 of the second dielectric layer 18. In this embodiment of applicant's invention the second electrically conductive layer 38 also comprises a plurality of spaced-apart electrically conductive strips 40 and the electrically conductive strips 40 are spaced in staggered relationship to the plurality of spaced-apart electrically conductive strips 22 of the first electrically conductive layer 20. By staggered relationship it is meant that there is at least a portion of each strip 40 that is radially spaced apart from portions of adjacent electrically conductive strips 22. This is illustrated in FIGURE 2.

A first electrically conductive strip 40′ of the second electrically conductive layer 38 is adjacent an outer edge 42 of the second dielectric layer 18 and is similarly coupled to an electrically conductive coating 34′ to provide continuous electrical contact throughout the length of the strip 40′. A lead 36′ is coupled to the electrically conductive layer 34′ and the second electrically conductive layer 38 thereby defines a second capacitor electrode for the capacitor 10.

Each strip 22 is spaced apart from the electrically insulated from each other of the strips 22 and, similarly, each strip 40 is spaced apart from the electrically insulated from each of the other electrically conductive strips 40. In the embodiment shown in FIGURES 1 and 2 the electrically conductive strips 22 are substantially equal in width and the spacing therebetween is substantially equal. Similarly, each of the electrically conductive strips 40 of the second electrically conductive layer 38 are substantially equal in width and substantially equally spaced apart.

Silver foil, gold foil, copper foil, tin foil, or other electrically conductive material may provide the electrically conductive strips 22 and electrically strips 40. However, applicant has found that in the preferred embodiment of applicant's invention the electrically conductive strips 22 comprising the first electrically conductive layer 20 are preferably metalized vacuum deposited upon the upper surface 24 of the dielectric layer 16. Similarly, the electrically conductive strips 40 comprising the second electrically conductive layer 38 are metalized vacuum deposited upon the upper surface 30 of the second dielectric layer 18. When this arrangement is utilized it will be appreciated that the second dielectric layer 18 is identical to the first dielectric layer 16 except that it has been turned end for end so that the electrically conductive strips 40 are in staggered relationship to the electrically conductive strips 22.

The utilization of metalized strips deposited on the dielectric layers 16 and 18 to define the first electrically conductive layer 20 and second electrically conductive layer 38 is preferred by applicant, since the number of separate elements to be wound together is minimized to just two. When individual foil strips are utilized a total of ten separate elements must be simultaneously wound: the two dielectric layers 16 and 18 and the eight electrically conductive strips. Thus, the complexities of the winding machine and winding operation are considerably reduced, since each element would have to be carried on a separate spool.

FIGURE 3 illustrates the commencement of the winding of the film member 12 upon the dielectric core 14. As shown on FIGURE 13 the upper surface 24 upon which are deposited the electrically conductive layer 22 is placed adjacent the dielectric core member 14 and the upper surface 30 of the second dielectric layer 18, upon which is deposited the electrically conductive strips 40 is placed adjacent the lower surface 28 of the first dielectric layer 16 and the two dielectric layers 16 and 18 are then simultaneously wound around the dielectric core 14. If necessary applicant has found that bonding may be utilized to secure the upper surface 24 of the first dielectric layer 16 to the dielectric core 14.

While the embodiment of applicant's invention illustrated in FIGURES 1 and 2 show the electrically conductive leads 36 and 36′ soldered to the electrically conductive layers 34 and 34′, respectively, applicant has found that the lead connection arrangement shown in applicant's co-pending patent application, Serial Number 338,351 filed on January 17, 1964, may also equally well be utilized. In utilizing such an arrangement it is only necessary that the dielectric core 14 be a tubular member rather than a solid member as shown.

In some applications it may not be desirable to provide an adhesive between the film member 12 and the core member 14. If there is slippage between the film member 12 and the core member 14 during the initial winding of the capacitor 10 the capacitor 10 may be wound about two adjacent core members. Such an arrangement is illustrated in FIGURE 4. As shown on FIGURE 4 a film member 44 which may be similar to film member 12 of FIGURE 1 is spirally wound around a pair of hollow tubular core members 46. The film member 44 comprises a first dielectric layer 48 and a second dielectric layer 50 and the first dielectric layer 48 has a first electrically conductive layer 52 deposited on one surface thereof and the second dielectric layer 50 has a second electrically conductive layer 54 deposited on a preselected surface thereof. As shown on FIGURE 4 the end of the film member 44 is placed between the two adjacent core members 46 and frictionally restrained therein. The film member 44 is then wound around the two adjacent core members any desired number of turns.

For the particular arrangement of the film member 12 illustrated in FIGURES 1 and 2, which may be considered to be comprised of the first dielectric layer 16, first electrically conductive layer, second dielectric layer 18 and second electrically conductive layer 38, it can be seen that the capacitor 10 acts as a series connection of individual capacitors. Since the amount of overlap between each strip 22 and each strip 40 is substantially the same and the dielectric constant of the dielectric layer 16 and 18 does not vary in the axial direction, the potential difference between any two opposed electrically conductive strips 22 and 40 such as, for example, 22' of the first electrically conductive layer 20 which comprises a first capacitor electrode and electrically conductive strip 40" of the second electrically conductive layer 38 which comprises a second capacitor electrode is one-seventh of the total potential between lead 36 and lead 36'. Therefore, comparatively high potentials may be maintained between lead 36 and lead 36' with only a comparatively small potential difference between each two opposed electrically conductive strips in the first capacitor electrode and the second capacitor electrode, respectively. Such an arrangement also provides utility as a delay line, since the uniform capacitance characteristics in the axial direction of the capacitor 10 allow rapid calculation of the total electron transit time between the capacitor lead 36 and the capacitor lead 36' when the breakdown voltage of the capacitor 10 is exceeded.

The dielectric layers 16 and 18 are illustrated as a single thickness layer. However, to provide higher voltage breakdown values applicant has found that multiple layer dielectrics may also be utilized. As shown on FIGURE 12 there is a multiple dielectric layer 170 comprised of, for example, four layers 172, 174, 176 and 178. The multiple layer dielectric may, if desired, be utilized in place of the single dielectric layers 16 and 18, or other dielectric layers described below, to achieve a higher breakdown voltage for a given thickness of dielectric material. The layers 172, 174, 176 and 178 may be conveniently wound together before winding into the capacitor 10.

While the capacitor arrangement 10 illustrated in FIGURES 1 and 2 show a wound capacitor according to applicant's invention that provides, in an electrical equivalent, a series connection of individual capacitors, applicant's invention may also be provided in an arrangement to proivde the electrical equivalent of a plurality of parallel connected capacitors. Such an arrangement is illustrated in FIGURES 5, 6 and 7. Referring thereto, there is shown a wound capacitor generally designated 60 having a tubular dielectric core member 62. A film member 64 comprising a first dielectric layer 66 and a second dielectric layer 68 is spirally wound around the tubular dielectric core member 62. The first dielectric layer 66 has a first electrically conductive layer 70 deposited thereon and in this embodiment the first electrically conductive layer 70 comprises a plurality of spaced-apart electrically conductive strips 72 which, for example, may be similar to the electrically conductive strips 22 shown on FIGURES 1 and 2. Each of the strips 72 is electrically insulated from each other strip. The electrically conductive strips 72 are spaced apart in a preselected relationship with respect to the dielectric core member 62 as described below in greater detail. A second electrically conductive layer 74 is coupled to the second dielectric layer 68 and, in this embodiment of applicant's invention, comprises a unitary electrically conductive strip substantially coextensive in the axial direction with the first dielectric layer 66 and the second dielectric layer 68. The second electrically conductive layer 74 may similarly be a metalized layer vacuum deposited upon the second dielectric layer 68. The first dielectric layer 66 and the second dielectric layer 68 may be similar to each other and to the first and second dielectric layers 16 and 18 illustrated in FIGURE 1.

A plurality of electrically conductive contact points 76 are coupled to the outside surface 78 of the tubular dielectric core member 62. As shown in FIGURE 6 there is provided an aperture through the tubular dielectric core member 62 adjacent each of the contacts 76. A capacitor lead is coupled to each of the contacts 76 and brought to regions external the capacitor 60 through the hollow core 80 of the tubular dielectric core member 62. Thus, for the arrangement shown in FIGURE 5, there are five contact points 76 and thus there are five leads 82, one of each of the leads 82 connected to each of the contacts 76.

The contacts 76 may comprise a solder connection of the lead 82 to restrain the lead 82 and the contact 76 on the external surface 78 of the tubular dielectric core member 62 in the preselected axially spaced location. It will be appreciated, however, that many other arrangements for providing the electrically conductive contacts 76 and the coupling of the lead 82 thereto may be provided. The arrangement illustrated in FIGURES 5 and 6 is only one of many such variations.

The contacts 76 are spaced so that each contact 76 engages one electrically conductive strip 72 of the first electrically conductive layer 70. Thus, an individual lead 82 is provided to each strip 72 and each strip 72 thus comprises the first plate of a capacitor and the second electrically conductive layer 74 comprising the unitary electrically conductive strip is a common second plate for the capacitances. The capacitor 60 thus is a compact arrangement of a plurality of wound capacitors having a common electrode. The film member 64 may be wound around the tubular dielectric core member 62 any desired number of turns to provide, through an increase in the area of the first electrically conductive layer 70 and second electrically conductive layer 74, any desired capacitance value. As can be seen from FIGURE 7 which is a sectional view through the film member 64, each of the strips 72 is substantially equal to each other strip 72 and thus the capacitances of each of the individual capacitors provided are substantially equal. The lead connection to the second electrically conductive layer 74 may be provided by solder dipping or metal spraying the edge portion 84 thereof to provide electrically conductive coating 86 to which the lead 88 is connected by, for example, soldering. It will be appreciated that instead of vacuum deposition of the electrically conductive strip 72 and the electrically conductive layer 74, they may be provided by suitable foil strips concentrically spirally wound around the tubular dielectric core member 62 in alternating layer arrangement with the dielectric layer 66 and dielectric layer 68. Such an arrangement is, of course, applicable to all embodiments of applicant's invention illustrated herein. While the arrangement illustrated in FIGURES 5, 6 and 7 provide in the capacitor 60 a plurality of individual and equal capacitances, applicant's invention can also provide a plurality of unequal capacitances in a single capacitor. A film member useful in providing such an arrangement in the embodiment illustrated on FIGURE 5 is shown on FIGURE 8. As shown on FIGURE 8 there is a film member generally designated 90 that may be utilized to replace the film member 64 shown on FIGURE 5. The film member 90 has a first dielectric layer 92 and a second dielectric layer 94. A first electrically conductive layer 96 comprising a plurality of electrically conductive strips 98, 100, 102, 104 and 106 is deposited upon the first dielectric layer 92. As shown on FIGURE 8 the strips comprising the first electrically conductive layer 98 are not equal in width, but are progressively wider by one unit of width. A second electrically conductive layer 108 comprising a unitary electrically conductive strip is vacuum deposited upon the second dielectric layer 94 and comprises a common second electrode for each of the electrically conductive strips comprising the first electrically conductive layer 96.

When a film member 90 is wound around the dielectric core member 62 illustrated in FIGURE 5, each of the contacts 76 engages one of the electrically conductive strips comprising the first electrically conductive layer 96. Thus, each of the leads 82 will provide a lead to an individual capacitor. The capacitances of each of the individual capacitors defined by each electrically conductive strip 98, 100, 102, 104 and 106 defining a first electrode thereof and the common capacitor electrode defined by the electrically conductive layer 108 is different by one unit of capacitance. It will be appreciated that differences in the capacitance may be made as desired. Thus, for example, instead of unitary differences they could be made decade differences by appropriately varying the width of each of the electrically conductive strips comprising the first electrically conductive layer 96. In the embodiment of applicant's invention shown in FIGURE 5, each of the leads 82 are, of course, electrically insulated from each other so that the individual capacitance may be obtained. FIGURES 9 and 10 illustrate another embodiment of applicant's invention wherein a predetermined variation in capacitances may be obtained in a single wound capacitor. As illustrated thereon there is a wound capacitor generally designated 110 having a tubular dielectric core member 112 and the tubular dielectric core member 112 may be similar to the tubular dielectric core member 62 illustrated in FIGURE 5. The tubular dielectric core member 112 has a plurality of contact means 114 which may be similar to the contacts 76 illustrated on FIGURE 5 coupled to the external surface 116 thereof and a plurality of lead means 118 electrically insulated from each other and each of the lead means 118 connected to one of the contacts 114.

A film member 120 has a first dielectric layer 122 and a second dielectric layer 124. A first electrically conductive layer 126 comprising a plurality of electrically conductive strips 128 may be metalized strips vacuum deposited on the first dielectric layer 122 in a manner similar to that shown for the first dielectric layer 66 and the first electrically conductive layer 70 shown on FIGURE 5. A second electrically conductive layer 130 comprising a plurality of electrically conductive strips 132 may be metalized strips vacuum deposited on the second dielectric layer 124 and thus the second dielectric layer 124 and second electrically conductive layer 130 may be similar to the combination of the first dielectric layer 122 and first electrically conductive layer 126 except turned end for end so that appropriate end connections for leads may be made to the second electrically conductive layer 130 in a manner illustrated on FIGURES 1 and 2.

When a film member 120 is wound around the dielectric core member 112 each of the contacts 114 engages one of the electrically conductive strips 128. Since each of the electrically conductive strips 128 is electrically insulated from each other of the electrically conductive strips, each such strip 128 comprises a first capacitor electrode within the capacitor 110. The lead 134 is coupled to the electrically conductive coating 136 on the end portion of the capacitor 110 to provide electrical continuity to the second electrically conductive layer 130 and provides that the second electrically conductive layer 130 may be considered a second capacitor electrode common to each of the individual first capacitor electrodes within the capacitor 110. Thus, different potentials may be applied between the individual leads 118 and the lead 134 to provide a plurality of individual capacitors in a compact and uniform arrangement. Since, as illustrated in FIGURES 9 and 10, the area between radially opposed strips 128 and 132 is substantially equal, the basic capacitance of each of the individual capacitances contained within the capacitor 110 will be equal. However, applicant has found that variable capacitance may similarly be provided in the arrangement illustrated in FIGURE 11. A film member 140 illustrated in FIGURE 11 can provide such an arrangement of different capacitances as desired. As shown on FIGURE 11 there is a first dielectric layer 142 of the film member 140 and a second dielectric layer 144. The first dielectric layer 142 has deposited thereon a first electrically conductive layer 146 comprising a plurality of spaced-apart electrically conductive strips 148, 150, 152, 154 and 156, and each of these electrically conductive strips is different in width from the other electrically conductive strips comprising the first electrically conductive layer 146. Similarly, a second electrically conductive layer 158 is vacuum deposited upon the second dielectric layer 144 and comprises a plurality of electrically conductive strips 160, 162, 164, 166 and 168. As shown on FIGURE 11, the electrically conductive strips comprising the first electrically conductive layer 146 are not in a uniform staggered relationship with the electrically conductive strips comprising the second electrically conductive layer 158 and therefore the area in radial alignment therebetween varies and thus the capacitance between any two strips comprising one from the first electrically conductive layer 146 and one from the second electrically conductive layer 158 that have at least a portion thereof in radial separation will vary. For example, a different capacitance will be obtained between the strip 156 and the electrically conductive strip 168 than is obtained between the electrically conductive strip 156 and the electrically conductive strip 166. Any suitable spacing and arrangement to provide any degree of overlapping in a radial separation between the strips of the first electrically conductive layer 146 and the second electrically conductive layer 158 may be selected to provide any desired capacitance values. The film member 140 may be wound on the tubular dielectric core member 112 illustrated on FIGURE 9 so that the appropriate leads 118 to each of the contacts 114 may be supplied to provide such a plurality of various capacitances within a single wound capacitor.

While the above embodiments of applicant's invention, wherein a plurality of individual electrically conductive strips are utilized in both electrically conductve layers, show only one layer having a strip adjacent each end, it will be appreciated that each electrically conductive layer could have a strip adjacent each end and still provide satisfactory capacitor operation, since each of the other electrically conductive strips is insulated from the remaining. This arrangement is illustrated in FIGURE 13. As shown thereon a wound film member 180, useful in the practice of applicant's invention, is comprised of dielectric layers 182 and 184 upon each of which are deposited a plurality of electrically conductive metalized strips 186 and 188, respectively. Strips 186' and 188' are adjacent a first end 187 of the film member 180 and strips 186'' and 188'' are adjacent a second end 189. The strips 186' and 188' are electrically coupled together by, for example, solder layer 190 to which is attached a lead 192. Similarly, strips 186'' and 188'' are electrically coupled together by, for example, solder layer 190' to which is coupled lead 194.

The other electrically conductive strips 186a, 186b and 188a, 188b, 188c are electrically insulated from each other and provide the desired capacitance values therebetween. Applicant has found that this arrangement shown on FIGURE 13 provides a stronger and more reliable end connection when the film member 180 is wound in a capacitor.

From the above it can be seen that applicant has provided an improved wound capacitor that not only is useful in high voltage applications and delay line applications, but also it can provide, in a single miniaturized or even microminiaturized unit a plurality of different capacitances as may be desired. It is obvious, of course, that there are an infinite number of variations of applicant's basic invention. Thus, the spacing of the electrically conductive strips and the width thereof may be varied to provide any degree of variation in the capacitances between the individual capacitors contained within the single wound capacitor of applicant's invention. Therefore, the following claims are intended to cover all such variations and adaptations falling within the true scope and spirit of applicant's invention.

What is claimed as new is:

1. A capacitor comprising, in combination:
   a tubular dielectric core member having peripheral walls defining a hollow core therethrough, and at least one aperture extending through said walls to provide communication between said hollow core and regions external said core member, and said at least one aperture spaced intermediate the ends of said dielectric core member;
   a multi-layer film member comprising a first dielectric layer and a second dielectric layer spirally wound around said core member a preselected number of turns, and said first dielectric layer and said second dielectric layer substantially coextensive throughout the length of said core member, and each of said first and said second dielectric layers having an upper surface and a lower surface;
   a plurality of spaced apart electrically conductive strips spirally wound around said dielectric core substantially parallel to each other and intermediate said upper surface of said first dielectric layer and said lower surface of said second dielectric layer;
   at least one electrically conductive strip spirally wound around said dielectric core member intermediate said upper surface of said second dielectric layer and said lower surface of said first dielectric layer;
   means for connecting a first capacitor lead to a first of said plurality electrically conductive strips; and
   at least one electrically conductive contact means coupled to said tubular core member and having a first portion on the external surface of said tubular core member for selective contact to said at least one electrically conductive strip, and a second portion extending in said aperture through said wall of said tubular core member to said hollow core, and means for connecting a lead to said second portion of said electrically conductive contact in said hollow core of said tubular core member.

2. A capacitor comprising, in combination:
   a tubular core member;
   a film member comprising a first dielectric layer and a second dielectric layer spirally wound around said core member and each of said first and said second dielectric layers having an upper surface and a lower surface;
   a plurality of spaced apart electrically conductive strips intermediate said upper surface of said first dielectric layer and said lower surface of said second dielectric layer;
   at least one electrically conductive strip intermediate said upper surface of said second dielectric layer and said lower surface of said first dielectric layer whereby said plurality of spaced apart electrically conductive strips define a first capacitor electrode and said at least one electrically conductive strip defines a second capacitor electrode;
   and a plurality of spaced apart electrically conductive contact means coupled to said tubular core member in axially spaced apart relationship and each having a first portion on the external surface of said tubular core member for selective contact with each of said plurality of spaced apart electrically conductive strips, and a second portion extending through the wall of said tubular core member to regions interior said tubular core member;
   and lead means electrically insulated from each other and each of said lead means coupled to one of said second portions of said electrically conductive contact means.

3. A wound capacitor comprising, in combination:
   a tubular core member;
   a multi-layer film member comprising a first dielectric layer and a second dielectric layer spirally wound around said core member and said first dielectric layer and said second dielectric layer substantially coextensive throughout the length of said core member and each of said first and said second dielectric layers having an upper surface and a lower surface and said upper surface of said first dielectric layer adjacent said lower surface of said second dielectric layer and said lower surface of said first dielectric layer adjacent said upper surface of said second dielectric layer;
   a plurality of electrically conductive strips coupled to said upper surface of said first dielectric layer;
   at least one electrically conductive strip coupled to said upper surface of said second dielectric layer;
   a plurality of axially spaced apart electrically conductive contact means having a first portion on the outer surface of said tubular core member and a second portion extending through the wall of said tubular core member and each of said first portions of said electrically conductive contact means selectively engaging one of said plurality of electrically conductive strips to provide electrical continuity therewith;
   a plurality of lead means electrically insulated from each other and selectively coupled to said second portions of said electrically conductive contact means; and
   means for connecting a second capacitor lead to said at least one electrically conductive strip coupled to said upper surface of said second dielectric layer.

4. The arrangement defined in claim 3 wherein said plurality of electrically conductive strips coupled to said upper surface of said first dielectric layer comprised metalized strips deposited on said first dielectric layer and said at least one electrically conductive strip comprises a metalized strip deposited on said second electrically conductive layer.

5. The arrangement defined in claim 4 wherein said plurality of electrically conductive strips are substantially equal in width and substantially equally spaced apart.

6. In a wound capacitor of the type having a tubular dielectric core member, with spirally wound first and second dielectric layers and first and second electrically conductive layers alternating with said dielectric layers thereon, and lead means the improvement comprising, in combination:
   said first electrically conductive layer comprising a first plurality of spaced apart electrically conductive strips and each of said first plurality of electrically conductive strips electrically insulated from each other of said first plurality of electrically conductive strips;
   and said second eelctrically conductive layer comprising a second plurality of spaced apart electrically conductive strips in staggered relationship to said first plurality of electrically conductive strips, and each of said second plurality of electrically conductive strips insulated from each other of said second plurality of electrically conductive strips;

said tubular dielectric core member having a plurality of axially spaced apart apertures through the wall thereof;

a plurality of electrically conductive contact means, each in one of said apertures in said wall of said tubular dielectric core member, and having a first portion on the external surface of the core member and a second portion extending through the wall into the interior of the tubular dielectric core member;

a plurality of lead means and each of said plurality of lead means electrically insulated from each other and selectively coupled to one of said second portions of said plurality of electrically conductive contact means, and said first portion of each of said electrically conductive contact means selectively engaging one of said first plurality of spaced apart electrically conductive strips whereby separate leads are provided to each of said first plurality of spaced apart electrically conductive strips; and lead means connected to a first strip of said second plurality of electrically conductive strips and said second electrically conductive layer defining a second capacitor electrode.

7. In a wound capacitor of the type having a tubular dielectric core member with spirally wound first and second dielectric layers and first and second electrically conductive layers alternating with said dielectric layers thereon, and lead means the improvement comprising, in combination:

said first electrically conductive layer comprising a first plurality of spaced apart electrically conductive strips and each of said first plurality of electrically conductive strips electrically insulated from each other of said first plurality of electrically conductive strips;

said second electrically conductive layer comprising a second plurality of spaced apart electrically conductive strips in co-extensive relationship to said first plurality of electrically conductive strips, and each of said second plurality of electrically conductive strips insulated from each other of said second plurality of electrically conductive strips;

said tubular dielectric core member having a plurality of axially spaced apart apertures through the wall thereof;

a plurality of electrically conductive contact means, each in one of said apertures in said wall of said tubular dielectric core member, and having a first portion on the external surface of the core member and a second portion extending through the wall into the interior of the tubular dielectric core member;

a plurality of lead means and each of said plurality of lead means electrically insulated from each other and selectively coupled to one of said second portions of said of said plurality of electrically conductive contact means, and said first portion of each of said electrically conductive contact means selectively engaging one of said first plurality of spaced apart electrically conductive strips whereby separate leads are provided to each of said first plurality of spaced apart electrically conductive strips; and lead means coupled to a preselected one of said second plurality of spaced apart electrically conductive strips, and said second electrically conductive layer defining a second capacitor electrode.

8. The arrangement defined in claim 6 wherein said first plurality of spaced apart electrically conductive strips are substantially equal in width and substantially equally spaced apart, and said second plurality of electrically conductive strips are substantially equal in width and substantially equally spaced apart.

9. The arrangement defined in claim 7 wherein at least one of said first plurality of spaced apart electrically conductive strips has a width greater than a second of said first plurality of spaced apart electrically conductive strips.

10. In a wound capacitor of the type having a tubular dielectric core member with spirally wound first and second dielectric layers and first and second electrically conductive layers alternating with said dielectric layers thereon, and lead means the improvement comprising, in combination:

said first electrically conductive layer comprising a first plurality of spaced apart electrically conductive strips and each of said first plurality of electrically conductive strips electrically insulated from each other of said strips;

said second electrically conductive layer comprises a unitary electrically conductive strip having portions radially spaced from each of said first plurality of spaced apart electrically conductive strips;

said tubular dielectric core member having a plurality of axially spaced apart apertures through the wall thereof;

a plurality of electrically conductive contact means, each in one of said apertures in said wall of said tubular dielectric core member, and having a first portion on the external surface of the core member and a second portion extending through the wall into the interior of the tubular dielectric core member;

a plurality of lead means and each of said plurality of lead means electrically insulated from each other and selectively coupled to one of said second portions of said plurality of electrically conductive contact means, and said first portion of each of said electrically conductive contact means selectively engaging one of said first plurality of spaced apart electrically conductive strips whereby separate leads are provided to each of said first plurality of spaced apart electrically conductive strips; and lead means connected to said unitary electrically conductive strip and said unitary electrically conductive strip defining a second capacitor electrode.

11. The arrangement defined in claim 10 wherein said plurality of spaced apart electrically conductive strips are substantially equal in width and subsequently equally spaced apart.

12. The arrangement defined in claim 10 wherein a first of said plurality of spaced apart electrically conductive strips has a width greater than a second of said plurality of electrically conductive strips.

13. An improved capacitor comprising, in combination:

a tubular dielectric core member having a plurality of axially spaced apart electrically conductive contact means on the outer surface thereof, and said core member having a radially disposed aperture therethrough adjacent each of said plurality of contact means;

a film member comprising spirally wound first and second dielectric layers and first and second electrically conductive layers alternating with said dielectric layers, said first electrically conductive layer comprising a first plurality of spaced apart electrically conductive strips at each of said first plurality of electrically conductive strips electrically insulated from each other, and each of said first plurality of spaced apart electrically conductive strips contacting one of said plurality of electrical contact means on said core member;

said second electrically conductive layer comprising a second plurality of spaced apart electrically conductive strips in staggered relationship to said first plurality of electrically conductive strips, and each of said second plurality of electrically conductive strips insulated from each other; and lead means connected to a first of said second plurality of spaced apart electrically conductive strips.

14. An improved capacitor comprising, in combination:

a tubular dielectric core member having a plurality of axially spaced apart electrically conductive contact means on the outer surface thereof, and said core member having a radially disposed aperture therethrough adjacent each of said plurality of contact means;

a film member comprising spirally wound first and second dielectric layers and first and second electrically conductive layers alternating with said dielectric layers, said first electrically conductive layer comprising a first plurality of spaced apart electrically conductive strips at each of said first plurality of electrically conductive strips electrically insulated from each other, and each of said first plurality of spaced apart electrically conductive strips contacting one of said plurality of electrical contact means on said core member;

said second electrically conductive layer comprising a unitary electrically conductive strip having portions axially spaced from each of said first plurality of spaced apart electrically conductive strips; and lead means coupled to said unitary electrically conductive strip.

15. The arrangement defined in claim 7 wherein said first plurality of spaced apart electrically conductive strips comprise metalized strips deposited on said first dielectric layer and said second plurality of spaced apart electrically conductive strips comprises metallized strips deposited on said dielectric layer.

16. The arrangement defined in claim 10 wherein said plurality of electrically conductive strips comprise metalized strips deposited on said first dielectric layer and said unitary electrically conductive strip comprises a metalized strip deposited on said second dielectric layer.

References Cited by the Examiner
UNITED STATES PATENTS

| | | | |
|---|---|---|---|
| 859,923 | 7/1907 | Davis | 317—260 |
| 2,053,334 | 9/1936 | Hetenyi | 317—260 |

FOREIGN PATENTS

| | | |
|---|---|---|
| 398,473 | 12/1931 | Great Britain. |
| 563,084 | 7/1944 | Great Britain. |
| 876,477 | 9/1961 | Great Britain. |

OTHER REFERENCES

German printed application, N 8,388, September 1956, Elben.

LEWIS H. MYERS, *Primary Examiner.*

E. GOLDBERG, *Assistant Examiner.*